(12) United States Patent
Guidotti et al.

(10) Patent No.: US 10,208,135 B2
(45) Date of Patent: Feb. 19, 2019

(54) CATALYST COMPONENTS FOR THE POLYMERIZATION OF OLEFINS

(71) Applicant: BASELL POLIOLEFINE ITALIA S.R.L., Milan (IT)

(72) Inventors: Simona Guidotti, Ferrara (IT); Dario Liguori, Ferrara (IT); Giampiero Morini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 50 days.

(21) Appl. No.: 15/516,651

(22) PCT Filed: Sep. 28, 2015

(86) PCT No.: PCT/EP2015/072200
§ 371 (c)(1),
(2) Date: Apr. 3, 2017

(87) PCT Pub. No.: WO2016/050662
PCT Pub. Date: Apr. 7, 2016

(65) Prior Publication Data
US 2018/0230247 A1    Aug. 16, 2018

(30) Foreign Application Priority Data

Oct. 3, 2014  (EP) .................................... 14187590

(51) Int. Cl.
*C08F 4/649*  (2006.01)
*C08F 4/645*  (2006.01)
*C08F 4/642*  (2006.01)
*C08F 10/06*  (2006.01)

(52) U.S. Cl.
CPC ............ *C08F 4/6494* (2013.01); *C08F 4/642* (2013.01); *C08F 4/6455* (2013.01); *C08F 4/6493* (2013.01); *C08F 10/06* (2013.01)

(58) Field of Classification Search
None
See application file for complete search history.

(56) References Cited

FOREIGN PATENT DOCUMENTS

| EP | 0519342 A2 | 12/1992 | |
|---|---|---|---|
| EP | 2712874 A1 | 4/2014 | |
| EP | 2787014 A1 | 10/2014 | |
| WO | WO-2013131912 A2 * | 9/2013 | ............. C07C 69/96 |
| WO | WO-2014161905 A1 * | 10/2014 | ............ C08F 110/06 |

OTHER PUBLICATIONS

PCT International Search Report and Written Opnion dated Jan. 7, 2016 (Jan. 7, 2016) for Corresponding PCT/EP2015/072200.

\* cited by examiner

*Primary Examiner* — Catherine S Branch

(57) ABSTRACT

A catalyst component comprising Ti, Mg, Cl, and an electron donor compound having porosity of at least 0.2 cm$^3$/g and characterized by the fact that it further comprises Cu oxide, with the proviso that when the electron donor compound is selected from esters of phthalic acids, the porosity is of at least 0.45 cm$^3$/g.

10 Claims, No Drawings

CATALYST COMPONENTS FOR THE POLYMERIZATION OF OLEFINS

This application is the U.S. National Phase of PCT International Application PCT/EP2015/072200, filed Sep. 28, 2015, claiming benefit of priority to European Patent Application No. 14187590.6, filed Oct. 3, 2014, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to catalyst compositions and the uses thereof to produce polyolefins.

BACKGROUND OF THE INVENTION

Ziegler-Natta catalyst systems can be used for stereospecific polymerization of olefins, which can include a solid catalyst component, with an alkylaluminum compound. The solid catalyst component can be made from or contain a titanium compound an an internal electron donor compound, both supported on a magnesium dihalide. The catalyst system can also include an external donor. This catalyst systemcan prepare, propylene polymers with high isotacticity and xylene insolubility. With relatively high porosity, these catalyst systems can be used to prepare high impact heterophasic copolymers made from or containing a crystalline propylene polymer and a very low crystalline, highly xylene-soluble in ethylene-based copolymer. To achieve these heterophasic copolymers, there is a need that the catalyst prepare the low crystallinity copolymer without clogging, forming chunks, agglomerating particles, or adhering to reactor walls.

Unfortunately, an increase in the catalyst system's porosity may decrease the catalyst system's polymerization activity and isospecificity. To address the loss in isospecificity, additional amounts of external donors can be required; however, the increase of external donors can further harm the catalyst's activity.

It would be therefore general interest the possibility of increasing the intrinsic capability of these solid catalyst components to produce stereoregular polymers. In fact, an intrinsically more stereospecific catalyst component would allow to use a lower amount of stereoregulating external donor to reach the target of polymer xylene insolubility and this, in turn, would be translated into the possibility of obtaining a higher plant productivity.

In U.S. Pat. No. 4,613,655 substantial amounts (30% by weight or higher) of different inorganic compounds and, among them $Cu_2Cl_2$ (table VII), is mixed with $MgCl_2$ and then ground in the presence of $TiCl_4$ in order to produce a catalyst. Apart from the effect of dilution of $MgCl_2$, the catalyst, used in the ethylene polymerization, did not show any improvement from the presence of $Cu_2Cl_2$. The catalysts have negligible porosity.

JP2010-155949 discloses the preparation of solid catalysts components according to several techniques all of them having in common the use of copper chlorides at various stages of preparation. According to this reference, the catalyst components containing Cu allows to increase the catalyst activity while the stereospecificity is maintained at the same level of the comparative catalyst (not containing Cu) or slightly increased. The catalyst have low and insufficient porosity.

Now the applicant has surprisingly found that it is possible to increase the stereospecificity of porous catalyst components based on Mg containing support on which are supported titanium atoms and donors by modifying it with Cu oxide compounds.

SUMMARY OF THE INVENTION

It is therefore an object of the present disclosure a solid catalyst component comprising Ti, Mg, Cl, and an electron donor compound having a porosity determined by mercury method deriving from pore with radius equal to or less than 1 μm of at least 0.2 $cm^3/g$ and characterized by the fact that it further comprises Cu oxide, with the proviso that when the electron donor compound is selected from esters of phthalic acids, the porosity is of at least 0.45 $cm^3/g$.

DETAILED DESCRIPTION OF THE INVENTION

Preferably, the amount of Cu oxide ranges from 0.1 to 5% wt expressed as Cu atoms and based on the total weight of the solid catalyst component, more preferably it ranges from 0.1 to 3% and especially from 0.2 to 2% wt.

The Cu/Ti weight ratio ranges from 0.01 to 0.5, preferably from 0.02 to 0.40.

Preferably, more than 60% and more preferably more than 70% of the titanium atoms are in +4 valence state. The total amount of Ti is typically equal to, or higher than, 0.5% and preferably higher than 0.8% wt with respect to the total weight of the solid catalyst component. In a specific embodiment it ranges from 0.5 to 6% more preferably from 0.8 to 5%.

Preferably, CuO is used as Cu oxide.

The particles of solid component have substantially spherical morphology and average diameter comprised between 5 and 150 μm, preferably from 20 to 100 μm and more preferably from 30 to 90 μm. As particles having substantially spherical morphology, those are meant wherein the ratio between the greater axis and the smaller axis is equal to or lower than 1.5 and preferably lower than 1.3.

The Mg atoms preferably derive from magnesium chloride and more preferably from magnesium dichloride.

The titanium atoms belong to compounds of formula $Ti(OR)_nX_{4-n}$ in which n is comprised between 0 and 4; X is halogen and R is an hydrocarbon radical, preferably alkyl, radical having 1-10 carbon atoms or a COR group. Among them, particularly preferred are titanium compounds having at least one Ti-halogen bond such as titanium tetrahalides or halogenalcoholates. Preferred specific titanium compounds are $TiCl_4$, and $Ti(OEt)Cl_3$.

The components of the present disclosure also comprise an electron donor compound (internal donor), selected from esters, ethers, amines, silanes and ketones or mixtures thereof. Particularly preferred classes are alkyl and aryl esters of optionally substituted aromatic mono or polycarboxylic acids such as for example esters of benzoic and phthalic acids, and esters of aliphatic acids selected from malonic, glutaric and maleic acids. Specific examples of such esters are n-butylphthalate, di-isobutylphthalate, di-n-octylphthalate, ethyl-benzoate and p-ethoxyethyl-benzoate. Also, the diesters disclosed in WO2010/078494 and U.S. Pat. No. 7,388,061 can be used. Among this class, particularly preferred are the 2,4-pentanediol dibenzoate derivatives. Moreover, can be advantageously used also the 1,3 diethers of the formula:

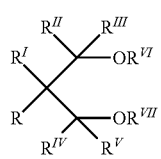 (I)

wherein R, $R^I$, $R^{II}$, $R^{III}$, $R^{IV}$ and $R^V$ equal or different to each other, are hydrogen or hydrocarbon radicals having from 1 to 18 carbon atoms, and $R^{VI}$ and $R^{VIII}$, equal or different from each other, have the same meaning of R-$R^V$ except that they cannot be hydrogen; one or more of the R-$R^{VIII}$ groups can be linked to form a cycle. The 1,3-diethers in which $R^{VI}$ and $R^{VII}$ are selected from $C_1$-$C_4$ alkyl radicals are particularly preferred.

Preferably, the final amount of electron donor compound in the solid catalyst component ranges from 1 to 25% by weight preferably in the range from 3 to 20% by weight.

In a specific embodiment, the internal electron donor is selected from alkyl and aryl esters of optionally substituted aromatic mono or polycarboxylic acids and its amount ranges from 5 to 15% wt, the amount of Ti atoms is from 1 to 3% wt and the amount of Cu is from 0.4 to 1.5% wt.

In another specific embodiment the internal electron donor is selected 1,3 diethers of the formula (I) and its amount ranges from 8 to 20% wt, the amount of Ti atoms is from 2.5 to 6% wt and the amount of Cu is from 0.2 to 1.2% wt.

The porosity is preferably higher than 0.25 more preferably higher than 0.30 $cm^3/g$. When the internal donor is selected from esters of phthalic acids the porosity is preferably higher than 0.5, more preferably higher than 0.55 and especially ranging from 0.6 to 1 $cm^3/g$.

The preparation of the solid catalyst component can be carried out according to several methods.

According to one of the preferred method the solid catalyst component can be prepared by reacting a titanium compound of formula Ti(OR)n-yXy, where n is the valence of titanium and y is a number between 1 and n, preferably $TiCl_4$, with a magnesium chloride deriving from an adduct of formula $MgCl_2$pROH, where p is a number between 0.1 and 2.2, and R is a hydrocarbon radical having 1-18 carbon atoms, said reaction being carried out in the presence of the electron donor that can be added simultaneously or in sequence. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Example of spherical adducts prepared according to this procedure are described in U.S. Pat. No. 4,399,054 and U.S. Pat. No. 4,469,648. The so obtained adduct is then subject to thermally controlled dealcoholation (80-130° C.) so as to obtain an adduct in which the number of moles of alcohol is generally lower than 2, preferably between 0.1 and 1.5.

In the preferred method of producing the catalyst of the present disclosure, the reaction with the Ti compound can be carried out by suspending the adduct (dealcoholated or as such) in cold $TiCl_4$ generally at 0° C. Preferably the adduct is used in an amount such as to have a concentration ranging from 20 to 100 g/l, and preferably from 30 to 90 g/l. The temperature is then gradually raised up until reaching a temperature ranging from 90-130° C. and kept at this temperature for 0.5-3 hours. According to a preferred embodiment, the donor is added in this first stage of reaction and preferably when the temperature of the mixture is in the range of 0°-40° C. The molar ratio with which it is used depends on the desired final amount of donor in the catalyst but generally the Mg/donor molar ratio may range from 1 to 25 and preferably from 5 to 20. After completing the reaction time stirring is stopped, the slurry is let to settle and liquid phase removed. A second stage of treatment with $TiCl_4$ is performed, preferably carried out at a temperature ranging from 70 to 110° C. When 1,3-diethers of formula (I) are used, it has been found preferable to feed again an aliquot of 1,3-diether more preferably when the temperature of the mixture is still in the range 40-80° C. Also in this case the amount of donor is to be selected according to the desired final amount on the catalyst but generally the total Mg/diether molar ratio may range from 1 to 15 and preferably from 3 to 10.

After completing the reaction time, stirring is stopped, the slurry is let to settle and liquid phase removed. Preferably, the solid catalyst component obtained after this step is contacted an additional time with the titanium compound and preferably with $TiCl_4$ under the same conditions described for the previous step with the difference that no donor is used. The so obtained solid can then be washed with liquid hydrocarbon under mild conditions and then dried. Several ways are available to add the Cu oxide. It is preferable use it in the form of particles having average size less than 60 μm, preferably less than 30 μm and more preferably less than 10 μm. Cu oxide in the above mentioned particle size is either available commercially or it can be obtained by applying conventional techniques such as milling. In a specific embodiment the CuO is added to the $MgCl_2$-alcohol system as a dispersion in alcohol. According to the preferred option, the Cu oxide is incorporated directly into the $MgCl_2$.pROH adduct during its preparation. In particular, the Cu oxide can be added at the initial stage of adduct preparation by mixing it together with $MgCl_2$ and the alcohol. Alternatively, it can be added to the molten adduct before the emulsification step. In this latter case it is recommended to use the Cu oxide in particles having average particle size of less than 10 μm.

The preparation of catalyst components in spherical form are described for example in European Patent Applications EP-A-395083, EP-A-553805, EP-A-553806, EPA601525 and WO98/44001.

The solid catalyst component has an average particle size ranging from 5 to 120 μm and more preferably from 10 to 100 μm.

As mentioned, in any of these preparation methods the desired electron donor compounds can be added as such or, in an alternative way, can be obtained in situ by using an appropriate precursor capable of being transformed in the desired electron donor compound by means, for example, of known chemical reactions such as etherification, alkylation, esterification, transesterification etc.

The solid catalyst components according to the present invention are converted into catalysts for the polymerization of olefins by reacting them with organoaluminum compounds according to known methods.

In particular, an object of the present invention is a catalyst for the polymerization of olefins $CH_2$=CHR, in which R is a hydrocarbyl radical with 1-12 carbon atoms, optionally in mixture with ethylene, comprising the product obtained by contacting:

(i) the solid catalyst component as disclosed above and
(ii) an alkylaluminum compound and, (iii) an external electron donor compound.

The alkyl-Al compound (ii) is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides, such as AlEt$_2$Cl and Al$_2$Et$_3$Cl$_3$, possibly in mixture with the above cited trialkylaluminums.

Suitable external electron-donor compounds include silicon compounds, ethers, esters, amines, heterocyclic compounds and particularly 2,2,6,6-tetramethylpiperidine and ketones.

Another class of preferred external donor compounds is that of silicon compounds of formula $(R_6)_a(R_7)_bSi(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatoms. Particularly preferred are the silicon compounds in which a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group, in particular methyl. Examples of such preferred silicon compounds are methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, methyl (3,3,3-trifluoro-n-propyl)dim ethoxy sil ane. Moreover, the silicon compounds in which a is 0, c is 3, $R_7$ is a branched alkyl or cycloalkyl group, optionally containing heteroatoms, and $R_8$ is methyl are also preferred. Examples of such preferred silicon compounds are cyclohexyltrimethoxysilane, t-butyltrimethoxysilane and thexyltrimethoxysilane.

The electron donor compound (iii) is used in such an amount to give a molar ratio between the organoaluminum compound and said electron donor compound (iii) of from 0.1 to 500, preferably from 1 to 300 and more preferably from 3 to 100.

Therefore, it constitutes a further object of the present invention a process for the (co)polymerization of olefins CH$_2$=CHR, in which R is hydrogen or a hydrocarbyl radical with 1-12 carbon atoms, carried out in the presence of a catalyst comprising the product of the reaction between:
(i) the solid catalyst component of the invention;
(ii) an alkylaluminum compound and,
(iii) optionally an electron-donor compound (external donor).

The polymerization process can be carried out according to known techniques for example slurry polymerization using as diluent an inert hydrocarbon solvent, or bulk polymerization using the liquid monomer (for example propylene) as a reaction medium. Moreover, it is possible to carry out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 5 MPa, preferably between 1 and 4 MPa. In the bulk polymerization the operating pressure is generally between 1 and 8 MPa, preferably between 1.5 and 5 MPa.

As already explained, the catalyst of the invention show, in propylene homopolymerization an increased activity/stereospecificity balance particularly due to increased stereospecificity compared with prior art catalysts not containing Cu atoms or containing a Cu compound different from Cu oxide. The following examples are given in order to better illustrate the invention without limiting it.

Characterization

Determination of Mg, Ti$_{(TOT)}$ and Cu

The determination of Mg, Ti $_{(TOT)}$ and Cu content in the solid catalyst component has been carried out via inductively coupled plasma emission spectroscopy on "I.C.P Spectrometer ARL Accuris".

The sample was prepared by analytically weighting, in a "Fluxy" platinum crucible", 0.1÷0.3 grams of catalyst and 2 grams of lithium metaborate/tetraborate 1/1 mixture. After addition of some drops of KI solution, the crucible is inserted in a special apparatus "Claisse Fluxy" for the complete burning. The residue is collected with a 5% v/v HNO$_3$ solution and then analyzed via ICP at the following wavelengths: Magnesium, 279.08 nm; Titanium, 368.52 nm; Copper, 327.40 nm.

Determination of Porosity.

Porosity and surface area with mercury: the measurement is carried out using a Pascal 140-240 series porosimeter by Carlo Erba.

The porosity is determined by intrusion of mercury under pressure. For this determination a calibrated dilatometer (capillary diameter 3 mm) CD3P (by Carlo Erba) is used, that is connected to a reservoir of mercury and to a high-vacuum pump. A weighed amount of sample is placed in the dilatometer. The apparatus is then placed under high vacuum and is maintained in these conditions for ca. 20 minutes. The dilatometer is then connected to the mercury reservoir and the mercury is allowed to slowly fill the dilatometer, until it reaches the level marked on the dilatometer at a height of 10 cm. The valve that connects the dilatometer to the vacuum pump is closed and then the mercury pressure is gradually increased with nitrogen up to 100 kPa. Subsequently, the calibrated dilatometer is transferred into an autoclave with oil for high pressure in order to reach pressure values up to 200 MPa. Under the effect of the pressure, the mercury enters into the pores of the particles and the mercury level decreases accordingly. The porosity (cm3/g), the pore distribution curve and the average pore size are directly calculated from the integral pore distribution curve, which is a function of both the volume reduction of the mercury and the applied pressure values. All these data are provided and elaborated by the porosimeter associated computer which is equipped with dedicated software supplied by Carlo Erba. After calculation, the average pores radius is given as weighted average of the single average pores radius contribution for each interval of porosity.

Determination of Internal Donor Content

The determination of the content of internal donor in the solid catalytic compound was done through gas chromatography. The solid component was dissolved in acetone, an internal standard was added, and a sample of the organic phase was analyzed in a gas chromatograph, to determine the amount of donor present at the starting catalyst compound.

Determination of X.I.

2.5 g of polymer and 250 ml of o-xylene were placed in a round-bottomed flask provided with a cooler and a reflux condenser and kept under nitrogen. The obtained mixture was heated to 135° C. and was kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of said xylene-soluble fraction is expressed as a percentage of the original 2.5 grams and then, by difference, the X.I. %.

Average Particle Size and Particle Size Distribution.

A Malvern Mastersizer 2000 instrument was used which consists of three units:
1) optical unit; Optical core unit suitable for measurements of solids of sizes ranging from 0.02 to 2000 μ, equipped with two laser beam sources: red He/Ne laser, power 5 mw, wave length 633 nm., blue (diode) laser, wave length 450 nm.
2) sampling Unit; Hidro 2000S automatic Sampling Unit for volumes between 50 and 120 ml, operating with internal capacity, centrifuge pump, stirrer and ultrasound probe with 40W power output.
3) PC console; Portable LG Pentium series, using Malvern Professional software for Windows 2000 or NT. Method of data elaboration using Mie optics theory (Refractive Index for sample=1.596; Refractive Index for n-heptane=1.39).

Method Description

For the measurements n-heptane (plus 2 g/l antistatic Span 80) is used as dispersing agent. Measuring cell is loaded with dispersing agent, while pump/agitator speed is set up to 2205 RPM. Background measurement is then taken. Then sample is loaded, by using a dedicated loading mean for solids or slurries Obscuration is then checked on monitor. Once constant steady obscuration is reached, the sample is subject to ultrasound waves by bringing the intensity of ultrasound probe to full scale (100% of the regulator) for 30 seconds; after that data are acquired for the PSD measurement. The average size is given as P50.

The particle size distribution (SPAN) is calculated with the formula wherein P90 is the value of the diameter such that 90% of the total volume of particles have a diameter lower than that value; P10 is the value of the diameter such that 10% of the total volume of particles have a diameter lower than that value and P50 is the value of the diameter such that 50% of the total volume of particles have a diameter lower than that value.

EXAMPLES

Procedure for the Preparation of the Spherical Adduct

An initial amount of $MgCl_2 \cdot 2.8 C_2H_5OH$ adduct containing the Cu compound was prepared according to the method described in Example 2 of WO98/44009, but operating on larger scale and adding the Cu compound of the type and in the amount as indicated in Tables 1 and 2. A Cu oxide powder having average particle size (P50) of 5.26 μm was slurred and stirred in anhydrous ethanol to get a 40% wt/vol of an homogeneous dispersion which was added to the ethanol/$MgCl_2$ mixture to prepare the said adduct. The CuO average particle size in said dispersion was found to be 6.4 μm. The so obtained adduct was then subject to thermal dealcoholation at increasing temperatures from 30 to 130° C. operating in nitrogen current until the desired molar alcohol content reported in tables 1 and 2 is obtained.

Procedure for the Preparation of the Diether-Based Solid Catalyst Component

Into a 500 ml round bottom flask, equipped with mechanical stirrer, cooler and thermometer 250 ml of $TiCl_4$ were introduced at room temperature under nitrogen atmosphere. After cooling to 0° C., while stirring, 9,9-bis(methoxymethyl)fluorene and 10.0 g of the spherical adduct (prepared as described above) were sequentially added into the flask. The amount of charged internal donor was such to meet a Mg/donor molar ratio of 6. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at temperature in the range of 110° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The obtained solid was then dried under vacuum and analyzed.

Procedure for the Preparation of the Phthalate-Based Solid Catalyst Component

Into a 500 ml round bottom flask, equipped with mechanical stirrer, cooler and thermometer 250 ml of $TiCl_4$ were introduced at room temperature under nitrogen atmosphere. After cooling to 0° C., while stirring, diisobutylphthalate and 10.0 g of the spherical adduct (prepared as described above) were sequentially added into the flask. The amount of charged internal donor was such to meet a Mg/donor molar ratio of 8. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at temperature in the range of 120° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The obtained solid was then dried under vacuum and analyzed.

General Procedure for the Polymerization of Propylene

A 4liter steel autoclave equipped with a stirrer, pressure gauge, thermometer, catalyst feeding system, monomer feeding lines and thermostating jacket, was purged with nitrogen flow at 70° C. for one hour. A suspension containing 75 ml of anhydrous hexane, 0.76 g of $AlEt_3$ (6.66 mmol), an external donor in amount of 0.33÷0.66 mmol and 0.006÷0.010 g of solid catalyst component, previously precontacted for 5 minutes, was charged. Dicyclopentyldimethoxysilane, D donor, was used as external donor; Al/D donor molar ratios used are specified in Tables 1 and 2. Some tests described in Tables 1 and 2 were also carried out without any external donor. The autoclave was closed and the desired amount of hydrogen was added (in particular, 2 NL in D donor tests and 1.25 NL in tests without external donor were used). Then, under stirring, 1.2 kg of liquid propylene was fed. The temperature was raised to 70° C. in about 10 minutes and the polymerization was carried out at this temperature for 2 hours. At the end of the polymerization, the non-reacted propylene was removed; the polymer was recovered and dried at 70° C. under vacuum for 3 hours. Then the polymer was weighed and characterized.

Examples 1-2 and Comparative Examples C1-C4

The diether-based solid catalyst components were prepared from spherical adducts $MgCl_2 \cdot pC_2H_5OH$ using the general method described above. Their composition and related propylene polymerization performance are indicated in Table 1.

Example 3 and Comparative Examples C5-C6

The phthalate-based solid catalyst components were prepared from spherical adducts $MgCl_2 \cdot pC_2H_5OH$ using the general method described above. Their composition and related propylene polymerization performance are indicated in Table 2.

Comparative Examples C7

The porosity of the solid catalyst component prepared as described in example 6 of EP 2787014 was reported in table 2.

TABLE 1

Diether-based solid catalyst components from spherical adducts

| | Support Synthesis | | Support Composition | | | Solid Catalyst Component | | | | | Polymerization | | |
|---|---|---|---|---|---|---|---|---|---|---|---|---|---|
| | Cu type | Cu/Mg mol | Mg % wt. | Cu % wt. | EtOH/Mg m.r. | Mg % wt. | Ti % wt. | Cu % wt. | Diether % wt. | Por. cm³/g | ED type | Mileage Kg/g | XI % wt. |
| Ex. 1 | CuO | 2.0 | 11.9 | 0.50 | 2.1 | 15.0 | 4.1 | 0.42 | 13.5 | 0.28 | D | 80 | 98.9 |
| Ex. 2 | | | | | | | | | | | none | 130 | 96.7 |
| C1 | CuCl₂ | 2.0 | 11.3 | 0.55 | 2.1 | 15.4 | 3.9 | 0.53 | 14.1 | 0.29 | D | 76 | 98.6 |
| C2 | | | | | | | | | | | none | 125 | 96.5 |
| C3 | none | — | 12.8 | — | 2.0 | 15.0 | 5.5 | — | 10.8 | 0.28 | D | 60 | 97.8 |
| C4 | | | | | | | | | | | none | 97 | 94.0 |

Diether = 9,9-bis(methoxymethyl)fluorene,
TEAL/D = 20 m.r.

TABLE 2

Phthalate-based solid catalyst components from spherical adducts

| | Support Synthesis | | Support Composition | | | Solid Catalyst Component | | | | | Polymerization | | |
|---|---|---|---|---|---|---|---|---|---|---|---|---|---|
| | Cu type | Cu/Mg mol | Mg % wt. | Cu % wt. | EtOH/Mg m.r. | Mg % wt. | Ti % wt. | Cu % wt. | DIBP % wt. | Por. cm³/g | ED type | Mileage Kg/g | XI % wt. |
| Ex. 3 | CuO | 2.0 | 16.3 | 0.70 | 1.0 | 19.5 | 2.1 | 0.80 | 8.2 | 0.75 | D | 20 | 97.9 |
| C5 | CuCl₂ | 2.0 | 15.2 | 0.80 | 1.0 | 18.5 | 1.9 | 0.93 | 6.1 | 0.77 | D | 17 | 97.5 |
| C6 | none | — | 16.2 | — | 1.0 | 20.3 | 2.2 | — | 9.4 | 0.76 | D | 18 | 97.2 |
| C7 | CuO | 2.0 | 10.2 | 0.45 | 2.9 | 18.3 | 2.6 | 0.73 | 11.6 | 0.39 | D | 74 | 97.9 |

DIBP = diisobutyl phthalate,
TEAL/D = 10 m.r.

What is claimed is:

1. A solid catalyst component comprising:
   (i) an amount (Ti) of titanium, based upon the total weight of the solid catalyst component,
   (ii) an amount (Mg) of magnesium, based upon the total weight of the solid catalyst component,
   (iii) an amount (Cl) of chloride, based upon the total weight of the solid catalyst component,
   (iv) an amount (IED) of an internal electron donor compound, based upon the total weight of the solid catalyst component, and
   (v) an amount (Cu) of copper oxide, based upon the total weight of the solid catalyst component,
   wherein
   the solid catalyst component has a porosity of at least 0.2 cm³/g as determined by a mercury method and pores with a maximum radius of about 1 upm,
   providing that
   when the internal electron donor compound is selected from the group consisting of esters of phthalic acids, the porosity of at least 0.45 cm³/g.

2. The solid catalyst component according to claim 1, wherein the amount (Cu) of copper oxide is in the range from about 0.1 to about 5% wt, expressed as copper atoms and based on the total weight of the solid catalyst component.

3. The solid catalyst component according to claim 1, wherein the amount (Cu) of Cu oxide is in the range from about 0.1 to about 3%.

4. The solid catalyst component according to claim 1, wherein the Cu oxide is CuO.

5. The solid catalyst component according to claim 1, wherein the porosity is higher than about 0.25 cm³/g.

6. The solid catalyst component according to claim 1, wherein the internal electron donor compound is selected from the group consisting of esters, ethers, amines, silanes, ketones, and mixtures thereof.

7. The solid catalyst component according to claim 6, wherein the internal electron donor compound is selected from the group consisting of alkyl and aryl esters of optionally substituted aromatic mono or polycarboxylic acids, esters of malonic acids, esters of glutaric acids, esters of maleic acids, and 1,3 diethers of the formula:

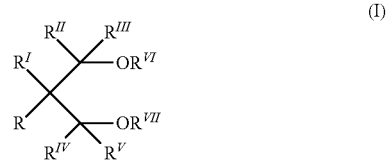

(I)

wherein

R, $R^I$, $R^{II}$, $R^{III}$, $R^{IV}$ and $R^V$ are the same as each other, different from each other, and hydrogen or hydrocarbon radicals having from 1 to 18 carbon atoms, $R^{VI}$ and $R^{VII}$, are the same as each other, different from each other, and hydrocarbon radicals having from 1 to 18 carbon atoms, and one or more of the R-$R^{VII}$ groups can be linked to form a cyclic group.

8. A process for polymerizing an olefin comprising:
(A) a polymerization step of polymerizing an olefin in the presence of a catalyst comprising a solid catalyst component comprising
  (i) an amount (Ti) of titanium, based upon the total weight of the solid catalyst component,
  (ii) an amount (Mg) of magnesium, based upon the total weight of the solid catalyst component,
  (iii) an amount (Cl) of chloride, based upon the total weight of the solid catalyst component,
  (iv) an amount (IED) of an internal electron donor compound, based upon the total weight of the solid catalyst component, and
  (v) an amount (Cu) of copper oxide, based upon the total weight of the solid catalyst component,
wherein
the solid catalyst component has a porosity of at least 0.2 cm³/g as determined by a mercury method and pores with a maximum radius of about 1 μm,
providing that
when the internal electron donor compound is selected from the group consisting of esters of phthalic acids, the porosity is of at least 0.45 cm³/g.

9. The process according to claim 8, wherein the olefin is propylene and further comprises a second olefin as a comonomer different than propylene, yielding a polyolefin having up to 10% of the polyolefin's total weight derived from the comonomer.

10. The solid catalyst component according to claim 1, wherein the internal electron donor compound is selected from the group consisting of esters of phthalic acids and the porosity is at least about 0.5 cm³/g.

* * * * *